US009479843B2

United States Patent
Hybertson et al.

(10) Patent No.: US 9,479,843 B2
(45) Date of Patent: *Oct. 25, 2016

(54) METHODS AND APPARATUS FOR SUPPORTING TRICK PLAY FUNCTIONS IN DEVICES WITHOUT LOCAL STORAGE

(71) Applicant: TIME WARNER CABLE ENTERPRISES LLC, New York, NY (US)

(72) Inventors: Eric D Hybertson, Longmont, CO (US); Robert Taylor, Boulder, CO (US); Edward P Galt, III, Boulder, CO (US); Thomas Harrison Reed, Superior, CO (US); Ernest Joseph Biancarelli, Denver, CO (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 23 days.

This patent is subject to a terminal disclaimer.

(21) Appl. No.: 14/562,209

(22) Filed: Dec. 5, 2014

(65) Prior Publication Data
US 2015/0143437 A1 May 21, 2015

Related U.S. Application Data

(63) Continuation of application No. 13/735,692, filed on Jan. 7, 2013, now Pat. No. 8,935,735.

(51) Int. Cl.
*H04N 21/442* (2011.01)
*H04N 21/472* (2011.01)
*H04N 21/643* (2011.01)
*H04N 21/6587* (2011.01)
*H04N 21/2387* (2011.01)

(52) U.S. Cl.
CPC ...... *H04N 21/6587* (2013.01); *H04N 21/2387* (2013.01); *H04N 21/44222* (2013.01); *H04N 21/47217* (2013.01); *H04N 21/64322* (2013.01)

(58) Field of Classification Search
CPC ............. H04N 21/4235; H04N 21/4147; H04N 21/43632; H04N 21/6587; H04N 21/64322; H04N 21/44222; H04N 21/47217; H04N 21/2387
See application file for complete search history.

(56) References Cited

U.S. PATENT DOCUMENTS

| 2002/0059637 | A1* | 5/2002 | Rakib | G08B 13/19656 |
| | | | | 725/119 |
| 2004/0078829 | A1* | 4/2004 | Patel | G06F 3/0482 |
| | | | | 725/135 |
| 2007/0150555 | A1* | 6/2007 | He | H04L 12/1859 |
| | | | | 709/219 |
| 2009/0031390 | A1* | 1/2009 | Rajakarunanayake | H04N 21/4135 |
| | | | | 725/142 |
| 2012/0096490 | A1* | 4/2012 | Barnes, Jr. | G06Q 10/02 |
| | | | | 725/34 |

\* cited by examiner (Continued)

*Primary Examiner* — Benjamin R Bruckhart
*Assistant Examiner* — Tien M Nguyen
(74) *Attorney, Agent, or Firm* — Michael P. Straub; Stephen T. Straub; Ronald P. Straub

(57) ABSTRACT

Methods and apparatus for providing playback devices with trick play functionality are described. The system includes a playback device, e.g., without recording capability, and a gateway device with multiple tuner-demodulators and/or a cable modem and recording capability. During normal playback, in some embodiments, both the playback device and gateway receive content in parallel with the gateway recording content at the request of the playback device and supplying the content over the local network when a user of the playback device requests a trick play operation. A single gateway, with multiple tuner demodulator pairs and/or a cable modem, supports trick play functions. In some embodiments if the number of playback devices exceeds the number of tuner-demodulator pairs in the gateway, the playback device can stream content to the gateway for recording and to be returned via the local network in the event of a request for a trick play operation.

20 Claims, 5 Drawing Sheets

METHODS AND APPARATUS FOR SUPPORTING TRICK PLAY FUNCTIONS IN DEVICES WITHOUT LOCAL STORAGE

RELATED APPLICATION

The present application is a continuation of U.S. patent application Ser. No. 13/735,692 filed Jan. 7, 2013 which is hereby expressly incorporated by reference in its entirety.

FIELD OF THE INVENTION

The present invention relates to methods and apparatus for providing trick play functionality, e.g., pause, reverse and fast forward, to playback devices without recording capability.

BACKGROUND OF THE INVENTION

Various playback devices such as set top boxes and IP streaming devices that do not have digital video recording capability often do not support trick play functions such as pause, rewind and fast forward after a portion of a program has already been recorded. This is because such functions are normally supported by recording to a buffer or storage device, sometimes referred to as a time shift buffer, and then playing back content from the time shift buffer in accordance with received trick play commands.

In view of the above discussion, it should be appreciated that there is a need for developing methods and/or apparatus which would allow playback devices such as set top boxes and IP devices which do not internally record content to support trick play functionality to be provided with trick play functionality.

SUMMARY OF THE INVENTION

Methods and apparatus for providing playback devices with trick play functionality are described.

In accordance with various embodiments, a playback device such as a set top box or IP capable playback device such as a cell phone and/or a tablet device is provided with trick play functionally via a local, e.g., home network, and a gateway device with recording capability.

In various embodiments the gateway device is a device with multiple tuners and demodulators and multiple network interfaces, e.g., a first network interface such as a cable network interface and a second network interface such as a local, e.g., home network interface. The gateway device may also include a transcoder and/or transrating module in addition to a packetizer for packetizing content received via the first network which is not already packetized. In at least some embodiments the transcoder performs both transcoding and transrating functions allowing the gateway device to recode and output content received via the first network, e.g., cable network, over the second network, e.g., after packetization by the packetizer. Thus, the gateway device can receive content via the first network and process it to the extent necessary before providing it to one or more devices on the local network. As will be discussed below, the gateway device is used in some embodiments to provide trick play functionally to one or more playback devices on the local home network. Thus, assuming availability of resources on the gateway device the playback devices on the home network can be provided with trick play functions via the gateway device. To the extent that tuner-demodulator pairs are needed on the gateway for higher priority operations such as providing tuner-demodulator functions to devices without tuner demodulator capabilities, trick play functions are provided to the playback devices on the local network. In the event that a playback device on the local network attempts to obtain access to trick play functionality but the gateway device does not have resources, e.g., unavailability of tuner-demodulator(s), to support a request for such services, a message is returned to the playback device indicating that trick play functions are temporarily unavailable, e.g., due to resource constraints.

At least some embodiments are directed to the case where a gateway device and the content play back device, e.g., client device, subscribe at least at some point in time to the same content and thus each have the same content available from the same or alternative sources, and then the client device switches to using the gateway device as the content source, e.g., for trick play purposes. The gateway and content playback device may both obtain, e.g., subscribe to QAM supplied content, both subscribe to multicast supplied content, or to same content delivered via alternative delivery methods, e.g., QAM/multicast channels/streams.

The methods and apparatus of the present invention go beyond simply receiving and supplying content, e.g., with optional transcoding of content, in that the methods and apparatus of the present invention take advantage of the time shift buffers included in the gateway to provide support for time shifted playback functions, e.g., trick play functions, for client/content playback devices, which may not include time shift buffers capable of supporting meaningful time shift playback options, e.g., capable of time shifting content by multiple minutes and/or one or more hours allowing, in some cases, complete playback of a program, show or multi-hour movie in a time shifted, e.g., delayed playback, manner.

In accordance with one exemplary embodiment, a playback device, e.g., without recording capability, seeking to obtain trick play functionality support from a gateway device at the same customer location as the playback device sends a message to the gateway device identifying content, e.g., a program, to be recorded. The message sent to the gateway device may include tuning information indicating the channel and frequency and optionally modulation information, used by the first network to deliver the requested content. The message to trigger recording of a program by the gateway device may, and normally is, sent in response to a signal from a user control device, e.g. a remote control or other playback device control to switch, tune, subscribe to or otherwise trigger playback, i.e., output, of a program. For example, when a user of a playback device selects a program from a guide, not only does the playback device such as a set top box, tune to and start outputting the selected program, it also sends a message to the gateway device to begin receiving and recording the program to thereby allow the gateway device to later support trick play operations that may be requested by a user of the playback device.

Output of a program by a playback device may, and in some embodiments is, performed by supplying the program content to a display or other device, e.g., for presentation to a user. In embodiments where the playback device includes the display, e.g., in tablet, cell phone and/or many other playback device embodiments, output of the program is performed by causing the display included in the playback device to display program content on the playback device's display.

The message to the gateway device provides sufficient information, e.g., a tuning triplet in some embodiments, for the gateway device to tune to, request, subscribe to and/or otherwise take the steps that may be required to begin receiving and/or recording the content selected by the user of the playback device. The message sent to the gateway device to trigger recording of content on behalf of the playback device may be, and in some embodiments is, sent over the home network to the gateway device. While in many embodiments the message to begin recording at the gateway is sent in response to user selection of a program or channel e.g., via a program guide selection operation made by a user selecting a program to be viewed, in other embodiments the message is sent in response to the user sending a trick play command via the remote control, e.g., a pause command, which then triggers the playback device to send the message to the gateway device to begin recording the content, e.g., program, which was selected by the user of the playback device.

As a result of the message to the gateway device, assuming availability of a tuner and/or demodulator and/or other subcomponent(s) required to receive and record the content identified in the message requesting recording to be performed, the gateway device will take the steps necessary to receive the identified program and record the program's content. The program may, and in some embodiments is, stored in a time shift buffer maintained in the gateway device, e.g., for a two hour or other time period, before being deleted in the event the recorded content is not being accessed for trick play purposes. In the case where the content is being supplied via a broadcast channel over the first network, the gateway device may, and in some embodiments does, tune to the broadcast channel and begin recording the program content. In the case of a switched digital video (SDV) service, the gateway device sends a message to the headend or hubsite to subscribe to the SDV channel being used to supply the program content to the playback device. Thus, in an SDV case where the playback device is SDV capable, both the gateway device and playback device will subscribe to the same SDV channel and receive the program content in parallel with the gateway device recording the content to facilitate trick play operations.

In the case of an IP capable playback device, the IP capable device may receive content from an IP content server via the first network and a cable modem and/or other network interface. The IP content server may transmit a unicast IP stream to the IP capable playback device with the content stream having been coded prior to transmission in a format that is supported and particularly well suited for the particular IP capable device, e.g., using a coding specification supported by the device and/or taking into consideration screen size and/or processing limitations of the device. In some embodiments the IP capable device is a cell phone, a tablet device, laptop, or Internet capable TV. In the case of an IP capable playback device embodiment, rather than request the same content from the IP content server which it does in some embodiments, the gateway device may tune to a broadcast channel which receives the program identified in the message sent by the playback device to the gateway device to initiate recording. In such a case, the gateway device may receive and record the same program content as is being supplied to the IP capable playback device but via a broadcast or SDV channel rather than via a unicast IP content stream. The program content supplied via the broadcast or SDV channel may be coded using a different video coding codec, e.g., coding standard, than the content supplied by the IP content server. Should the IP capable playback device send the gateway device a trick play request in such a case, the gateway device transcodes the content, as may be necessary to put it in a format used by the IP capable playback device, prior to sending the content to the IP capable playback device. In such embodiments the transcoding may degrade the quality of the video supplied via the gateway device over the home network and/or not be of the same quality as the content provided by the content server. As should be appreciated, the content server may store pre-coded content for a variety of different devices which may have been coded to a high level of quality using relatively expensive coders. In contrast the transcoding performed in the gateway device may be done in real time as it is being supplied to the IP capable playback device over the home network. Accordingly, in such cases it may be desirable to switch back to the IP content stream from the content server when possible, i.e., when not operating in trick play mode.

From the above discussion it should be appreciated that during initial normal playback operation, program content is received and processed in parallel by both the gateway device which records the content and the playback device which outputs the content for display. Thus, while the gateway device may be recording content corresponding to the output of the multiple playback devices at the home at the same time, the content is received via the first network and need not be communicated at the same time over the local network thereby minimizing the normal load on the local network.

When a user of one of the playback device in the home initiates a trick play command via a remote control device, the playback device receives and detects the command. In response the playback device receiving the command sends a message to the gateway device requesting that the gateway device supply the content corresponding to the trick play command, e.g., reversed or paused content. The gateway device responds by supplying the program content to the requesting playback device over the local network in accordance with the trick play command. Once content has been paused or rewound, the gateway can also support fast forward, skip and/or other forward direction trick play requests received from the playback device in response to a corresponding user command sent via a control device.

The gateway device will respond to forward direction playback requests up until the point of reaching a live point in the requested program. The live point in the program is the point at which the output of the gateway device catches up, i.e., matches the point at which content is being received by the gateway device for the program being output.

The gateway device may signal, e.g., send a message to, the playback device, e.g., set top box, that the live point has been reached thereby making the set top box aware that subsequent content will be provided in real time as it is received by the gateway device. Alternatively, in some embodiments the set top box may detect reaching of the live point by comparing the program content that it is receiving from the gateway and the content it is receiving from the first network and determining that the content, e.g., frames, being received via both inputs is within a predetermined amount of time as may be determined from presentation time stamps or other time stamps included in the content supplied via the first, e.g., cable, network and via the local, e.g., home network.

While the live point may be reached by the result of a forwarding operation, e.g., a skip or fast forwarding operation, the program live point may also be reached by a user selecting a live mode option, e.g., by selecting an option via the user control device, e.g., remote control.

In response to receiving a signal from the user control device indicating that a switch should be made to live mode or detecting that the live point has been reached, the playback device makes a decision as to whether it should switch from outputting program content received from the gateway device via the local network or back to outputting the program content being received via the first network. Since the playback devices tuner/demodulator corresponding to the first network can be left tuned to the channel used to receive the program even when the program content is being obtained and output via the local network, switching back to output the program content received directly from the first network need not take a large amount of time. However, it may still introduce a momentary glitch into the output of the content. For this reason, in some embodiments once the live point has been reached, commercial and/or program boundaries are detected and switching between program content being output by the gateway device in real time to outputting the content received via the first network is timed to occur at the point where a commercial boundary is present, e.g., at the start of a commercial. This makes the switch less noticeable and reduces the risk that program content of interest may not be viewed by a user or disrupted as a result of the switch between the gateway device supplied content and the content received directly via the first network.

In some embodiments, when the live point is reached the playback device makes a decision as to whether it should switch to outputting the content being supplied via the first network or content being supplied via the gateway device. The decision whether or not to switch is based, at least in some embodiments, on local network loading. Local network loading conditions may be directly communicated to the playback device via a network controller, router or other network element aware of local network load or detected by the set top box. For example lost packets, high packet jitter and/or a lower than desired achieved data rate over the local network may, and in some embodiments is, interpreted by the playback device as an indication of local network congestion. Thus, in at least some embodiments, the playback device makes an assessment of local network congestion based on, e.g., lost packets, packet error rates, packet jitter, obtained packet data rate and/or received network loading messages and/or other network information and makes a decision whether or not to switch the program output to the content received directly, e.g., from a headend/hubsite, via the first network from the content received via the local network.

If the decision is to switch back to the content being supplied directly via the first network, the playback device sends a message to the gateway device to stop supplying it the program content via the local network. The gateway device responds to such a message by ceasing to output the received program content to the playback device via the local network thus reducing the traffic load on the local network. Such a traffic congestion based decision is particularly beneficial where local bandwidth may be limited, e.g., because the local network is a WiFi or other wireless network with limited bandwidth capability.

While the gateway device may stop supplying content to the playback device it will continue to receive and record the program content being received by the playback device so that it will be able to respond to any future trick play commands that may be issued by the user of the playback device.

It should be appreciated that a gateway device including multiple tuner-demodulator pairs, can support trick play functions for a corresponding number of playback device. Since all the playback device are not likely to request trick playback at the same time, the number of devices for which the gateway device supports trick playback can, and in some embodiments is, greater than the number of content streams that can be supported simultaneously over the local network, i.e. assuming that all playback devices are not requesting trick play content at the same time.

In some embodiments the gateway device keeps track of which device requested recording of content supplied by a particular program channel and supplied the recorded content without the playback device having to identify the program channel to which the trick play commands relate. However, in some embodiments the trick play commands identify the program channel and/or program to which a trick play request corresponds. Frame time and/or another time reference may also be included in the trick play request in some such embodiments. In embodiments where the gateway device records multiple different program channels at the same time, a playback device may obtain trick play content that was previously recorded for another device by sending a request in the form of a trick play command and identifying the program channel, time to which the command relates and the type of command, e.g., fast forward or reverse. The gateway device will comply with the request and provide the trick play content via the home network if it is stored in one of its buffers even if the request comes from a device which did not originally initiate the recording of the program content.

While the gateway device may match a tuner-demodulator to a particular playback device, when multiple playback devices request recording of the same program channel, the gateway device may, and in some embodiments does, make a single recording of the program received via the identified program channel and use that single recording to support trick playback requests from multiple devices.

In some embodiments when a gateway device runs out of tuner-demodulators sufficient to support recording requests used to support trick play operations, the gateway device signals to the requesting playback device that the requesting playback device should stream the program content received via the requesting playback device's tuner demodulator to the gateway device for recording. In at least some such embodiments the gateway device then records the content streamed from the playback device and can respond to trick play requests from the playback device by transmitting back the recorded content to the playback device in accordance with the trick play request received from the playback device. In some such embodiments, while the playback device receives the content from the gateway device in accordance with the trick play message sent to the gateway device, the playback device continues to stream the program content which is received to the gateway device for recording. While this approach potentially doubles the amount of traffic on the local network as compared to the embodiment where the gateway device and the playback device both receive the content directly from the first network, this approach has the advantage of allowing the gateway device to support trick playback operation via the local network without the gateway having to dedicate tuner/demodulator resources to supporting the particular playback device which supplies the content to be recorded and used for trick play purposes.

While in many if not most embodiments, the gateway device includes one or more QAM tuner and demodulator pairs capable of receiving content received via a QAM channel, in some embodiments the gateway device includes a cable modem and does not include QAM tuner-demodulator pairs. In such an embodiment content can, and is, received via the cable modem, recovered and supplied to a content playback device in response to a trick play command, e.g., a pause command from the content playback device. Thus, at least in some embodiments, pause and/or other trick play functionality can be supported by a gateway device which does not include a traditional QAM tuner/demodulator pair. In one such embodiment the gateway and client device subscribe to the same multi-cast stream. In another embodiment where the gateway device includes a cable modem but not a QAM demodulator pair, the gateway device may receive content via the cable modem via subscription to an IP multicast while the contentment playback device receives the content via a QAM channel but with the content obtained from the IP multicast being supplied from the gateway device over the home network in response to a pause or other trick play request.

It should be appreciated that numerous additional variations and embodiments are possible and remain within the scope of the invention. Various features and embodiments will be discussed further in the detailed description which follows.

Numerous additional features, embodiments and benefits are described in the detailed description which follows.

Various additional features and advantages of the present invention are discussed in the detailed description which follows.

DETAILED DESCRIPTION

Figure 1:
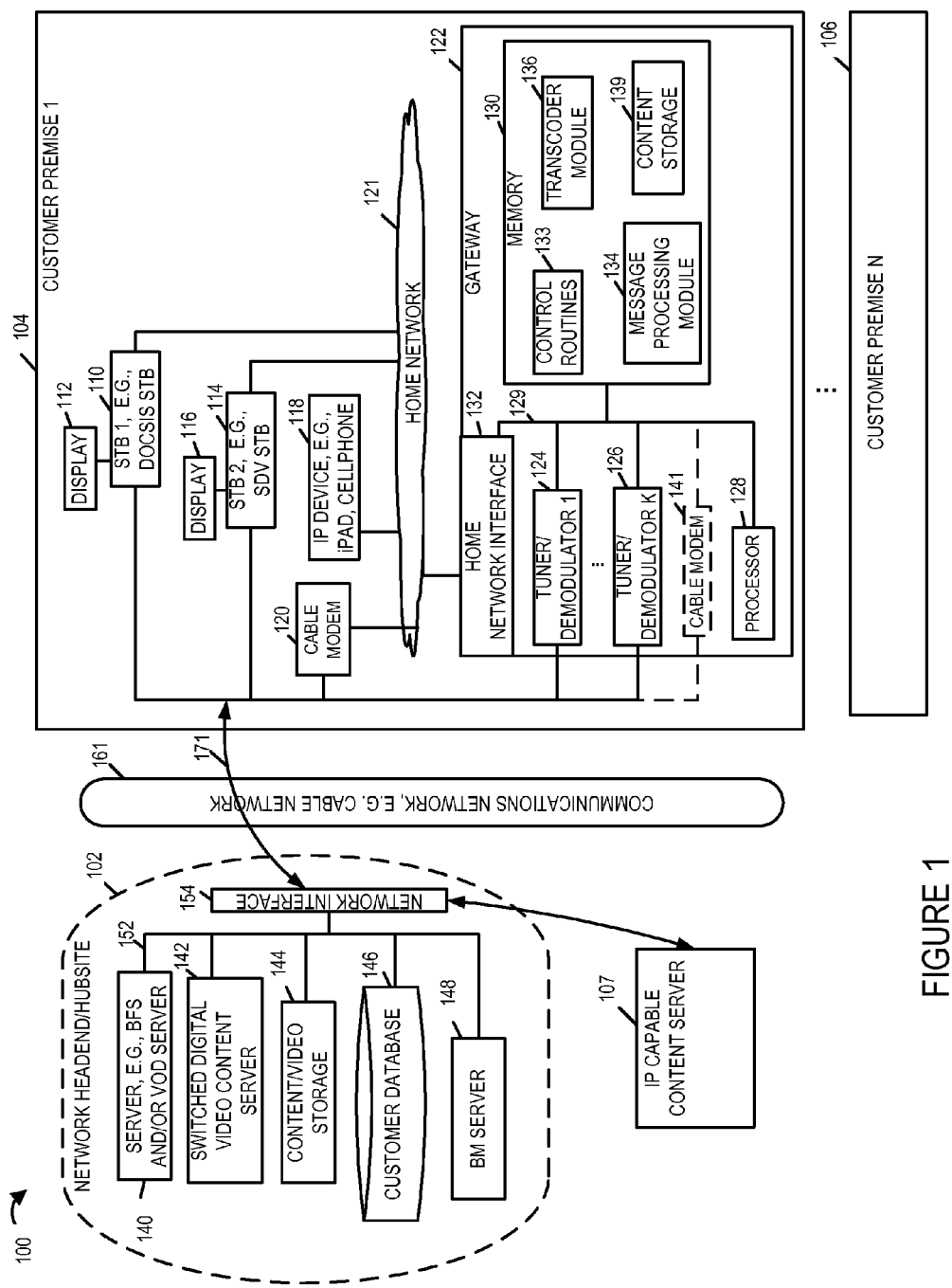
FIG. 1 illustrates an exemplary system implemented in accordance with the some embodiments of the present invention.

FIG. 1 illustrates an exemplary system 100 implemented in accordance with one exemplary embodiment of the present invention. The system 100 supports delivery of content to customer premise equipments (CPEs), e.g., set top box, internet capable TVs, mobile phones etc., in accordance with some embodiments of the invention. The system 100 includes a network headend/hubsite 102, a cable network 161, e.g., a hybrid fiber-coaxial (HFC) network and/or internet, an IP capable content server 107, and a plurality of customer premises 104, 106. In various embodiments the content, e.g., multimedia content, is delivered from the headend 102 and/or IP content server 107 over the cable network 161 to one or more CPEs in the customer premises 104, 106. As will be discussed, in some embodiments, some of the CPE devices at the customer premises do not have DVR capability. In accordance with the features of various embodiments, the CPE devices without local storage for recording program content are able to perform the trick play functions such as rewind, fast forward, pause etc., with the assistance of an exemplary video gateway device 122.

The network headend/hubsite 102 may be implemented at a cable network office or hubsite serving a plurality of customer premises and includes multiple servers and databases which are coupled together as shown. In the FIG. 1 example, the headend/hubsite 102 includes a content server, e.g., a broadcast file server (BFS) and/or a video on-demand (VOD) server 140, a switched digital video (SDV) content server 142, a content storage 144, a customer database 146 and a business management server 148. It should be appreciated that various servers and/or elements shown to be included in the headend 102 may reside outside the headend 102 in some embodiments and may be located anywhere in the system 100, e.g., in a distributed manner. In the FIG. 1 example, various servers and other elements included in the headend/hubsite 102 are coupled together by a local network 152. The local network 152 is coupled via one or more network interfaces 154 to other networks and/or devices. For example, the headend/hubsite 102 is coupled via network interface 154 to communications network 161, e.g., a cable network, and may also be coupled to one or more other external networks. In some embodiments system 100 may also include one or more mobile network(s) including one or more base stations (BS) for supporting communications, e.g., delivery of content and/or other signaling, with mobile devices such as cell phones.

Via the cable network 161, the elements shown in the network headend/hubsite 102 can send and/or exchange various information with the devices located at the customer premises 104, 106. As shown in FIG. 1, communications link 171 traversing the cable network 161 couples the CPEs 110, 114, 120, and 122 to the various elements/servers shown in the network headend 102 and to the IP content server 107.

The server 140, e.g., a broadcast file server (BFS), among other things, is responsible for delivering programming content, e.g., analog program content, and/or other information to one or more content playback devices at the customer premises 104, 106, including live content and video on-demand content ordered by one or more customers. The switched digital video (SDV) content server 142 provides digital programming content to one or more content playback devices which support receiving SDV content. In various embodiments the content servers 140, 142 access the programming content from the content storage 144 and generate transport streams suitable for delivery to various CPEs via the communications network 161. The content storage 144 stores content, e.g., audio, video and/or other multimedia content. In some embodiments the content stream is encrypted prior to delivery to the CPEs over the communications network 161.

The customer database 146 includes, for a plurality of customers, customer information, account information and information regarding the devices installed at customer premises. In some embodiments customer account information includes, e.g., customer account number, customer subscription/service information, customer device capability and other billing related information. Customer database 146 also includes customer device information, e.g., identification and/or other information regarding customer devices such as video gateways, STBs, cable modems etc., installed at various customer premises served by the headend/hubsite 102.

BM (Business management) server 148 processes billing information corresponding to customers serviced by the headend 102. This may include updating billing charge information in response to changes in services being provided to the customer, upgrades, on-demand content purchases, and/or other activity. Business management server 148 also processes services bill payment information, e.g., bill payment transactions, deductions from debit accounts, e-mail bills, and/or processes discount and/or other information.

Each customer premise 104, 106 may include a plurality of CPEs, e.g., content playback devices. In various embodiments the CPEs located at the customer premises include, e.g., gateways, modems, routers, and content playback devices including, e.g., set top box, internet capable TVs, personal computers, laptops, tablet devices, smart phones etc. In various embodiments a content playback device presents the program content to a viewer, e.g., a customer/subscriber. In FIG. 1 embodiment, customer premise 104 includes a STB 1 110, e.g., a DOCSIS (Data Over Cable Service Interface Specification) set top box, coupled to display device 112, a STB 2 114, e.g., an SDV capable set top box, coupled to a display device 116 and an IP capable device 118, e.g., an iPAD, a cable modem 120 and a video gateway 122. The content playback devices, e.g., STBs 110, 114 and the IP device 118, the cable modem 120 and the gateway device 122 are coupled to the local home network 121 over which they communicate and exchange information. The display devices could be, e.g., standard televisions. It should be appreciated that in some embodiments content playback devices can be integrated in a device which also includes a display. In some embodiments the STB 110 is a DOCSIS 3.0 set top box. The SDV capable set top box devices, e.g., STB 114, support receiving SDV programming content from the headend/hubsite 102 over the communications network 161. The IP capable device 118, could be any of a variety of devices that support communications over IP, e.g., cell phones, tablet devices such as iPAD, computers etc. In at least some embodiments the content playback devices at the customer premise 1 104, e.g., STBs 110, 114 and the IP device 118, do not have a DVR or other local storage within the device.

In some embodiments the exemplary video gateway device 122 includes a processor 128, a memory 130 and a home network interface 132 coupled together by a bus 129. In some embodiments the video gateway device 122, in addition to the above discussed elements, includes a cable modem 141 and/or one or more tuners and demodulator pairs 124 through 126 which can be used to receive video and/or data content. In one embodiment the gateway 122 receives programming content via IP streams which can then be recorded and/or supplied to one or more set top boxes or IP devices, e.g., via the home network. In some embodiments the cable modem 141 is included in the gateway device 122 and the gateway device 122 does not include traditional tuner/demodulator pairs 124 through 128. Thus, in one embodiment with respect to the coax feed the gateway device 122 can be considered a DOCSIS-only gateway with storage capabilities and the capability to stream/supply content received via the DOCSIS modem to other devices, e.g., via an Ethernet, coax, or other interface. In such an embodiment the gateway device 122 does not include traditional QAM tuner/demodulators and the programming content is received via the cable modem 141 which processes the IP streams providing programming content received from the IP content server 107.

In other embodiments the gateway device 122 includes tuner/demodulators 124 through 128 but does not include the cable modem 141. In still other embodiments the gateway 122 includes both tuner/demodulator pairs 124, 126 and cable modem 141. Thus it should be appreciated that a variety of implementations are possible and a wide variety of content playback devices can be supported by the gateway 122.

In some embodiments the gateway device 122 is a DOCSIS 3.0 compatible gateway device which includes a DSG (DOCSIS Set-top Gateway) agent and which serves as a CMTS (cable modem termination system). While shown in the customer premise the gateway 122 may, and in some embodiments is, located outside the customer premise, e.g., at a hubsite to which the customer premise is located. However, in most embodiments the gateway device 122 is a residential gateway located at the customer premise site, e.g., in the home of user, to which the set top boxes and the other playback devices serviced by the residential gateway 122 correspond. In the residential gateway device, an Ethernet is often used for the home network although coax, wireless and/or other types of home networks and/or network interfaces can be and are supported in some embodiments. In a DOCSIS gateway embodiment, the set top boxes which interact with the gateway include a DSG client which can receive content which is tunneled from the gateway 122 to the DSG client of the set top box, e.g., over an Ethernet, a wireless connection and/or a coax connection to the set top box or other content playback device. In some embodiments, content is received and stored in buffers, e.g., prior to the content being supplied from the gateway device to a content playback device, e.g., in response to a trick play or other playback command.

The memory 130 includes control routines 133, a message processing module 134, a transcoder module 136 and a content storage 139. The various modules perform various functions in accordance with the invention. The operation of the exemplary gateway device and the functions of various modules are discussed later in detail. In accordance with one aspect of some embodiments, when a content playback device such as STBs 110, 114 and/or the IP device 118 tunes to receive programming content, the video gateway device 122 also tunes to receive the same programming content using its tuner/demodulators and starts recording the programming content. In accordance with one feature of some embodiments when a user instructs a content playback device, e.g., STB or IP device, at the customer premise 104 to, e.g., rewind, or pause, the playback device sends a request to the gateway device 122 requesting the gateway device 122 to supply the programming content with the appropriate trick mode, e.g., rewind, pause etc., through the home network 121. In response the gateway device 122 serves the content playback device the requested, e.g., paused or rewound, content stream and the user is able to perform various trick play mode actions through the content playback device on the content stream received from the gateway device via the home network.

Figure 2:
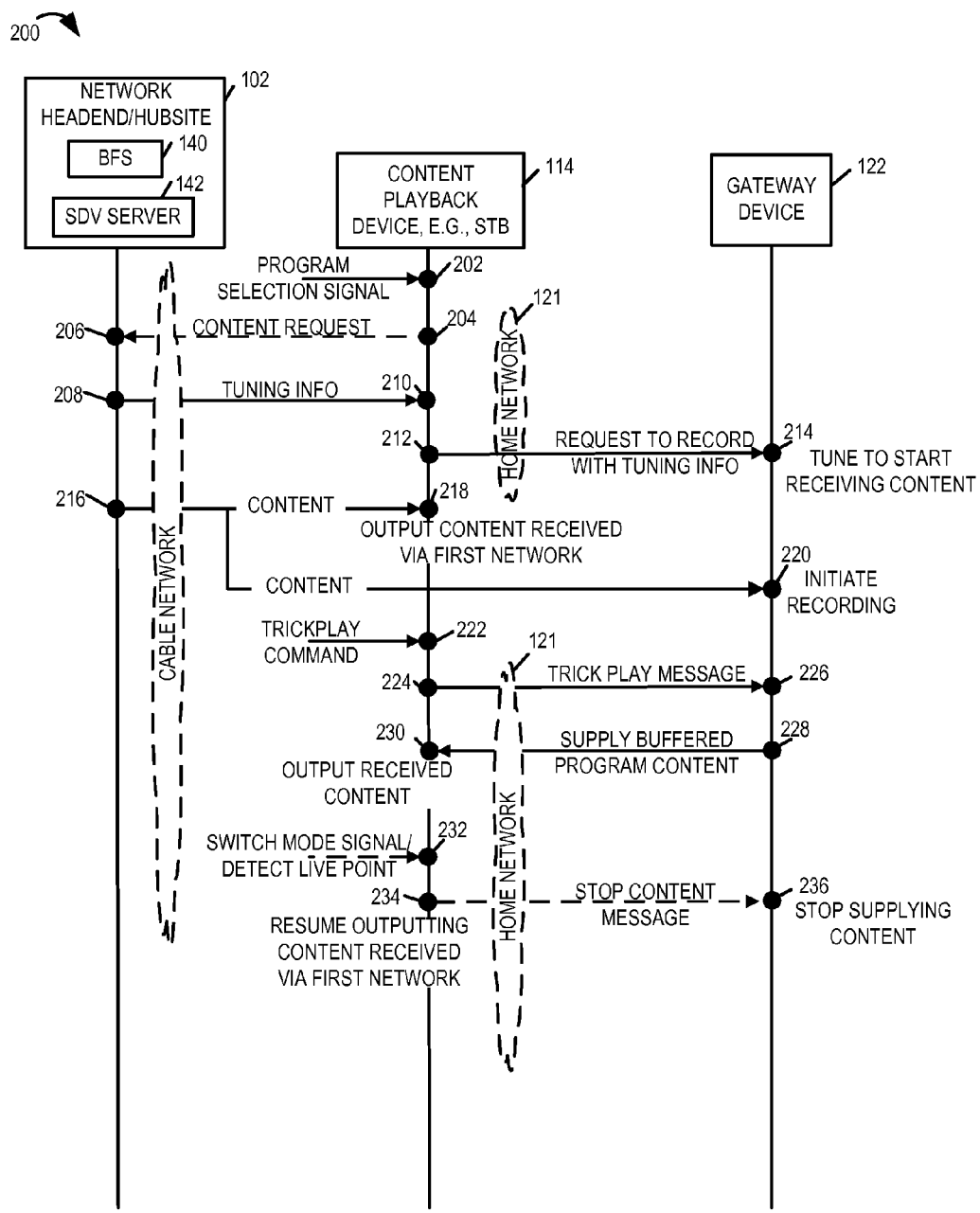
FIG. 2 illustrates the steps and associated signaling exchange between various devices performed in an exemplary embodiment implemented using the system shown in FIG. 1.

Having generally discussed the exemplary system shown in FIG. 1, an exemplary method will now be discussed in detail with regard to the example shown in FIG. 2. Elements of the system 100 shown in FIG. 1 which participate in the method being described in the FIG. 2 example are shown at the top of FIG. 2 and bear the same reference numbers as used in FIG. 1. Messages, information, content and/or signals communicated between devices are represented in FIG. 2 using arrows.

At the top of FIG. 2, various elements 200 of the system 100 which may participate in the exemplary method of supporting trick playback of a program at a customer premise in accordance with one embodiment of the invention, are shown. The illustrated components 200 include the network headend/hubsite 102, content playback device, e.g., STB 114, and the gateway device 122. The BFS 140 and SDV content server 142 included in the headend/hubsite 102 are also shown.

FIG. 2, illustrates the steps and associated signaling used in one exemplary embodiment where a customer, located at a customer premise, e.g., CP 104, starts receiving program content from a content server at the headend/hubsite 102 via the first network, e.g., cable network 161, and performs trick play functions with the support from the gateway device 122 in accordance with some embodiments of the invention. In the illustrated embodiment the content playback device is a set top box (STB), e.g., SDV capable STB 114, however it should be appreciated that another type of content playback device may be used in other embodiments.

The process starts in step 202 where the content playback device receives a request for program content corresponding to a program. The content request may be received, e.g., when a user selects a program, e.g., from the program guide or otherwise, to watch. Such a request may be initiated, e.g., by user making a selection using a remote control. The program may be e.g., a television show, news, movie etc. In the SDV embodiments, where the content playback device is an SDV capable STB, in step 204 the STB sends a content request signal to subscribe to the headend/hubsite 102. The content request signal is shown using dashed arrow to indicate the signal is optional and not used in all embodiments. In some other embodiments when the content playback device is e.g., a DOCSIS STB, no such content request is needed and the STB may receive the program content by tuning to the channel on which the content stream is broadcast by the BFS server 140 in the headend 102.

In step 206 the SDV content server 142 receives the request and processes the request to identify the requested program content. In step 208 the SDV server 142 sends tuning information including, e.g., channel number, frequency and modulation information, to the STB 114 to receive the program content. The STB 114 receives the information over a first network, e.g., the cable network 161, and processes the information in step 210. In step 212 the content playback device sends a record message to the gateway device 122 to trigger recording of the program content by said gateway device 122. In some embodiments the record message includes tuning information needed for the gateway device to receive the requested program content. The gateway device 122 receives the record message and tuning information in step 214 and processes the information. In step 214 the gateway device checks if a tune-demodulator is available and if so allocates the tuner-demodulator to start receiving the program content to be recorded.

In step 216 it is illustrated that a content server, e.g., BFS or the SDV depending on the embodiment, sends the content corresponding to the requested program to the devices at the customer premise over the first network, e.g., cable network 161. The program content is received by the STB in step 218 via the cable network 161 and the STB starts outputting the program content, e.g., a first portion of the program to the user, e.g., on a display device. The gateway device 122 receives the program content and initiates recording in step 220.

In accordance with one feature of various embodiments when program content corresponding to a program is being output by the playback device, i.e., during playback, the content playback device monitors for trick play control signals, e.g., trick play commands, from the user on an ongoing basis. In step 222 it is illustrated that the content playback device receives a trick play command, e.g., to rewind, fast forward etc., from the user, e.g., a control signal indicating a trick play action sent to the STB via a remote control. In step 224 the STB sends a trick play message to the gateway device 122 requesting the gateway device 122 to provide a second portion of the program in accordance with the trick play command. In some embodiments the second portion of the program can be a part of the first portion which was previously recorded. In various embodiments the trick play message is sent to the gateway device 122 via a second network, e.g., the local home network. In some embodiments the home network is a Ethernet network. In some embodiments the home network is a WiFi network.

In step 226 the gateway device 122 receives and processes the trick play message and determines the requested trick play action, e.g., rewind, pause etc. Next in step 228 the gateway device 122 sends the program content corresponding to the second portion of the program as instructed in accordance with the trick play message. For example, if the trick play command is a rewind command, the gateway device 122 provides, from the recorded/buffered program content, program content starting at a point that satisfies the rewind trick play request. In some but not necessarily all embodiments, the gateway device 122 performs one of a transcoding or transrating operation on the program content stream prior to sending the program content to the playback device 114 and supplies the transcoded or transrated program content to the playback device in response to the trick play message. In step 230 the STB 114 receives the program content in accordance with the trick play command, e.g., rewound program content, from the gateway device 122 via the local home network 121. Further in step 230 the STB switches from outputting program content received from the headend/hubsite 102 via the first network to outputting program content received from the gateway device 122 via the home network. Thus the content received from the gateway device 122 is output to the user, e.g., on the display device, in step 230.

In some embodiments the content playback device 114 continues to output the content received from the gateway device via the home network 121 either up until a live playback point is reached or a user signal to switch to a real time playback mode is received. The real time playback mode, when selected, will cause the playback device to output the program content in real time. In various embodiments once content has been paused or rewound, the gateway device 122 can also support fast forward, skip and/or other forward direction trick play requests received from the playback device in response to a corresponding user command, e.g., sent via a control device such as a remote control. The gateway device responds to forward direction playback requests up until the point of reaching a live point in the requested program. In various embodiments the live point in the program is the point at which the output of the gateway device 122 catches up, i.e., matches the point at which content is being received by the gateway device for the program being output, e.g., from the content source such as the content servers in the headend/hubsite 102. In some embodiments when it is detected that a live point has been reached the playback device, e.g., STB 114, makes a decision whether to continue receiving the content in real time from the gateway device or to stop receiving the content from the gateway 122 and output program content received from the headend/hubsite content servers, e.g., BFS or the SDV server, via the cable network. In some embodiments when a live point is reached the gateway device 122 signals, e.g., send a message to, the STB 114 that the live point has been reached thereby making the STB 114 aware that subsequent content will be provided in real time as it is received by the gateway device 122. The user may decide to continue receiving the content in real time from the gateway device after the live point has been reached.

In various embodiments the content playback device is configured to monitor for a user command from a user input device indicating user desired change to a real time mode of playback operation or reaching of the live playback point. In step 232 it is illustrated that the STB 114 detects either a switch mode signal from the user indicating to switch to a real time mode of playback, or detects a live point during the playback of program content. In some embodiments when a switch mode signal is received and a live point in playback has not been reached, the playback device makes a decision in step 234 to stop receiving content from the gateway device and switch to outputting the program content received from the content servers via the cable network 161. In FIG. 2 example, to simplify illustration and discussion it is considered that when the switch mode signal is received the live point in playback has not been reached. Accordingly as illustrated, in step 234 the STB 114 sends a stop signal to the gateway device 122 instructing the gateway device 122 to stop providing program content to the STB 114, and starts outputting content received via the cable network from the headend/hubsite 102 content server.

If a live point in playback has been reached when a switch mode signal is received, the playback device makes a decision in step 234 whether to switch to outputting program content received via the first network or to continue using program content being supplied by the gateway device. In some such cases in step 234 the STB 114 makes the decision whether to switch to outputting program content received via the first network, e.g., cable network 161, or to continue outputting program content supplied by the gateway device as a function of network congestion on the second network, e.g., the home network 121, being used to supply content from said gateway device 122 to said playback device 114. For example, when a high congestion on the local network is detected the playback device decides to switch to outputting program content received via the cable network 161 which allows for a more seamless and better viewing experience and also vacates the tuner-demodulator and buffer resources in the gateway device. In some embodiments when the decision is to switch to outputting program content received from said first network the playback device 114 sends a stop signal to the gateway device 122 instructing the gateway device 122 to stop providing program content to the STB 114, and starts outputting content received via the cable network from the headend/hubsite 102 content server as shown in step 234. Such a traffic congestion based decision is particularly beneficial where local network bandwidth may be limited, e.g., when the local network is a WiFi or other wireless network with limited bandwidth capability. In step 236 the gateway device 122 receives the stop signal and responds by ceasing to output the program content to the playback device via the local network thus reducing the traffic load on the local network. In some embodiments while the gateway device may stop supplying content to the playback device it will continue to receive and record the program content being received by the playback device so that it will be able to respond to any future trick play commands that may be issued by the user of the playback device.

However when the decision is to continue using program content being supplied by said gateway device 122, the playback device 114 refrains from transmitting the stop signal and continues to receive the program content in real time from said gateway device 122. In such a case the playback device continues to output the program content received from the gateway device 122.

In some embodiments the network loading conditions for the local network 121 may be directly communicated to the playback device, e.g., STB 114, via a network controller, router or other network element aware of local network load or detected by the STB 114. In some embodiments lost packets, high packet jitter and/or a lower than desired achieved data rate over the local network is interpreted by the STB 114 as an indication of congestion on local network 121.

Figure 3:
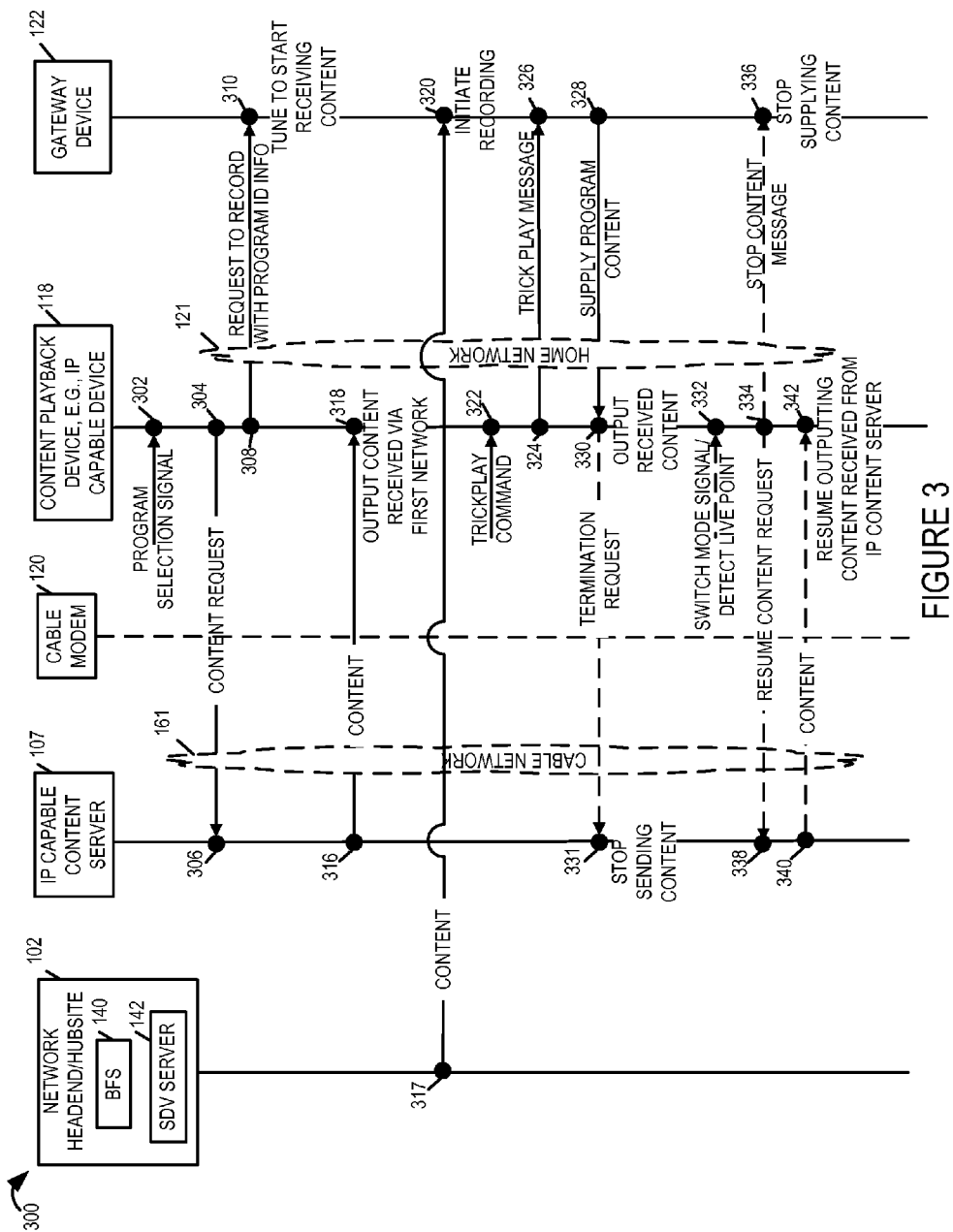
FIG. 3 illustrates the steps and associated signaling exchange between various devices performed in accordance with an exemplary embodiment where an IP capable content playback device is used.

FIG. 3 is a drawing 300 illustrating the steps and associated signaling used in one exemplary embodiment of the invention where the content playback device is an IP capable device, e.g., such as a cell phone, IP set top box, a tablet device such as an iPAD, computer etc. Elements of the system 100 shown in FIG. 1 which participate in the exemplary method of supporting trick playback of a program at a customer premise in accordance with one embodiment of the invention, are shown at the top of FIG. 3 and bear the same reference numbers as used in FIG. 1. The illustrated components include the network headend/hubsite 102 which includes content servers 140, 142, IP capable content server 107, cable modem 120, IP capable content playback device 118, and the gateway device 122. In various embodiments the IP capable content playback device 118 and the gateway device 122 communicate over the local network 121.

Some of the signaling and processing shown in FIG. 3 embodiment is similar to the one illustrated in FIG. 2 example, however the signaling in FIG. 3 embodiments is well suited to support the features of the present invention for IP capable content playback devices such as IP device 118. It should be noted that in accordance with one aspect of various embodiments an IP capable device normally receives real time programming content from an IP capable content server via the first, e.g., cable network 161, in a format well suited for the IP content playback device 118. In some embodiments the IP capable content server 107 is located external to the headend/hubsite 102.

In accordance with the features of some embodiments of the invention the IP capable playback device 118 performs trick play functions with the support from the gateway device 122. The exemplary process starts in step 302 where the IP playback device 118 receives an input indicating a request to playback a program e.g., a television show, news, movie etc. The content request may be received in variety of ways, e.g., user selection of a program via a remote control, selection of the program on a touch screen of the IP playback device 118, or in various other ways. In step 304 the IP playback device 118 sends a content request signal to the IP content server 107, e.g., requesting a unicast content stream from the IP capable content server 107. It should be appreciated that in various embodiments a signal from the IP capable device 118, e.g., such as the content request in step 304, going out to an external network or server as the IP content server 107 goes through the cable modem 120. Similarly the signals and content stream coming from an external network or server to the IP capable device 118 goes through the cable modem 120.

In step 306 the IP content server 107 receives the request and processes the request to identify the requested program content. In Step 308 the IP playback device 118 sends a record message to the gateway device 122 to trigger recording of the program content by said gateway device 122. In some embodiments the record message includes program identification information and/or one or more parameters for the gateway device to identify and receive the requested program. The gateway device 122 receives the record message along with the program identification information and/or relevant parameters in step 310 and processes the information. In the illustrated embodiment, further in step 310 the gateway device 122 checks if a tune-demodulator is available and if so allocates the tuner-demodulator so that the identified program content can be received and recorded. Furthermore, in various embodiments the gateway device 122 tunes to the channel over which the identified program is broadcast from the headend/hubsite 102 in order to receive the identified program.

In step 316 it is illustrated that the IP capable content server 107 sends the content corresponding to the requested program over the first network, e.g., cable network 161, to the IP content playback device 118. The program content is received by the IP playback device 118 in step 318 through the cable modem 120 and the IP playback device 118 starts outputting the program content, e.g., a first portion of the program to the user. Thus it should be appreciated that in various embodiments the program content sent via the cable network 161 is received by the IP playback device 118 through the cable modem 120. In step 320 the gateway device 122 receives the content corresponding to the requested program from the headend/hubsite, e.g., from BFS 140, via the first network 161 and the gateway device 122 initiates recording the content.

In various embodiments the IP playback device 118 monitors for trick play control signals, e.g., trick play commands, from the user while the program content corresponding to the requested program is being output. In step 322 the IP capable playback device 118 receives a trick play command, e.g., to rewind, fast forward etc., from the user. In step 324 the IP playback device 118 sends a trick play message to the gateway device 122 requesting the gateway device 122 to provide a second portion of the program in accordance with the trick play command. In some embodiments the second portion of the program can be a part of the first portion which was previously recorded. In various embodiments the trick play message is sent to the gateway device 122 via a second network, e.g., over the local home network 121.

In step 326 the gateway device 122 receives and processes the trick play message and determines the requested trick play action, e.g., rewind, pause etc. It should be noted that the recorded program content recorded by the gateway device 122 may not be in a format suitable for the IP capable playback device 118. For example the format may not be suitable for transport to and/or playback by the IP device 118. Accordingly in some embodiments following the receipt of trick play message the gateway device 122 performs at least one of a transcoding or a transrating operation on the recorded program content to generate program content suitable for the IP capable device 118. In some embodiments the gateway device transcodes and/or transrates the program content to generate a program content stream appropriate for the IP playback device 118, packages the stream in HLS (HTTP live stream), protects the stream with appropriate DRM (digital rights management) prior to transmitting the program content stream to the IP capable device 118 over the home network 121. In step 328 the gateway device 122 sends the program content stream in accordance with the trick play message to the IP capable device 118 as illustrated in the Figure. In step 330 the IP capable device 118 receives the program content in accordance with the trick play command from the gateway device 122 via the local home network 121. Further in step 330 the IP capable device 118 switches from outputting program content received from the IP content server 107 via the first network 161 to outputting program content received from the gateway device 122 via the home network 121. Thus the content received from the gateway device 122 is output to the user in step 330. Furthermore in some embodiments following the receipt of program content from the gateway device 122, the IP capable device 118 sends a termination signal to the IP content server 107 instructing to stop sending the unicast program content stream. The termination signal is an optional signal as indicated by dashed arrow and may not be sent by the IP capable device 118 in all embodiments. However it helps avoiding unnecessary wastage of cable network bandwidth and other resources which are consumed in sending, receiving, and processing the content stream when this content is not being output by the IP capable device 118. In the embodiments where such a termination signal is sent, the IP capable content server 107 receiving the terminal signal responds by terminating the unicast program content stream as illustrated in step 331.

In various embodiments the IP capable playback device 118 monitors for a user command indicating a user desired change to a real time mode of playback operation and for reaching of the live playback point during the playback. In step 332 it is illustrated that the IP capable device 118 detects either a switch mode signal from the user indicating to switch to a real time mode of playback, or detects a live point during the playback of program content. In some embodiments when a switch mode signal is received and a live point in playback has not been reached, the IP playback device 118 makes a decision in step 334 to stop receiving content from the gateway device and switch to outputting the program content provided by the IP capable content server 107 via the cable network 161. For simplicity and discussion purposes consider that when the switch mode signal is received the live point in playback has not been reached. Accordingly as illustrated, in step 334 the IP capable device 118 sends a stop signal to the gateway device 122 instructing the gateway device 122 to stop providing program content stream to the IP device 118, and starts outputting program content received from the IP capable content server 107 assuming that the unicast content stream from the IP content server 107 was not terminated earlier. In step 336 the gateway device 122 receives the stop signal and responds by ceasing to output the program content to the IP capable playback device 118 via the local network thus reducing the traffic load on the local network. In some embodiments while the gateway device 122 stops supplying content to the playback device it continues to receive and record the program content so that can respond to any future trick play commands that may be issued by the user of the IP capable playback device 118.

In the embodiments where the program content stream from the IP content server 107 was terminated (e.g., as in step 331) the IP device 118 in step 334 sends a resume content request to the IP capable content server 107 which receives the request in step 338. This optional signaling is shown with dashed arrows with the associated steps 334, and 338. In some such embodiments if the content stream was earlier terminated, then as illustrated in step 340 the IP content server 107 resumes sending the program content stream over the cable network 161 to the IP capable device 118. In step 342 the IP capable device 118 receives the program content stream and resumes outputting the program content.

If a live point in playback has been reached when a switch mode signal is received, the IP capable playback device 118 makes a decision in step 334 whether to switch to outputting program content received from the IP content server 107 or to continue using program content being supplied by the gateway device 122 over the home network 121. In some such cases in step 334 the IP capable playback device 118 makes the decision whether to switch to outputting program content received from the IP content server 107, or to continue outputting program content supplied by the gateway device e.g., based on the quality of content, e.g., video and/or audio, being output. The IP capable device 118 may decide to continue to receive and output the program content received from the gateway device 122 even after the live playback point has been reached or may decide to resume the content stream from the IP content server 107. In some such embodiments when the decision is to continue using program content being supplied by said gateway device 122 over the home network 121, the IP capable playback device 118 refrains from transmitting the stop signal to the gateway device 122 and continues to receive the program content in real time from said gateway device 122.

In the embodiments where the gateway device 122 includes a cable modem 141 but not the traditional QAM tuner-demodulators, upon receiving a request to record in step 310 the gateway device 122 subscribes, e.g., to IP multicast stream, e.g., from the IP content server 107, to receive the requested program content to be recorded. The program content is then supplied from the gateway device 122 over the home network 121 in response to a pause or other trick play request.

Figure 4:
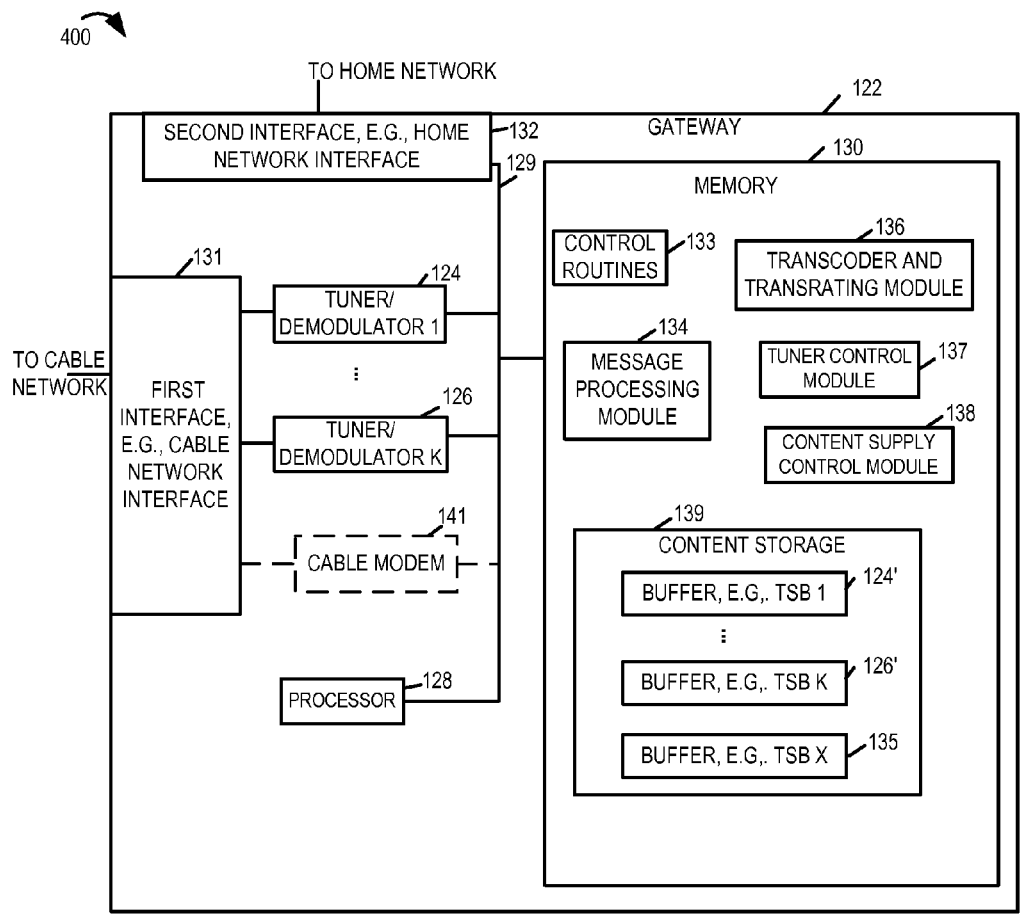
FIG. 4 illustrates an exemplary gateway communications device implemented in accordance with some exemplary embodiments.

FIG. 4 is a drawing 400 illustrating the exemplary gateway communications device 122 and various elements of the gateway device in greater detail. As discussed below, the exemplary gateway device 122 implements/perform various functions that allow content playback devices without DVR capability to perform various trick play functions in accordance with various features of the inventions.

As shown, the gateway device 122 includes a processor 128, first interface, e.g., cable network interface 131, a second interface, e.g., home network interface 132, and a storage device, e.g. a memory 130 coupled together via a bus 129. The various elements of the gateway device 122 can exchange data and information over the bus 129. In some embodiments the video gateway device 122, in addition to the above discussed elements, includes a cable modem 141 and/or one or more tuners and demodulator pairs 124 through 126 which can be used to receive video and/or data content. In one embodiment the gateway 122 receives programming content via IP streams which can then be recorded and/or supplied to one or more set top boxes or IP devices, e.g., via the home network. In some embodiments the cable modem 141 is included in the gateway device 122 and the gateway device 122 does not include traditional tuner/demodulator pairs 124 through 128. In such an embodiment the gateway device 122 does not include traditional QAM tuner/demodulators and the programming content is received via the cable modem 141 which processes the IP streams providing programming content received from the IP content server 107. In other embodiments the gateway device 122 includes tuner/demodulators 124 through 128 but does not the cable modem 141. In still other embodiments the gateway 122 includes both tuner/demodulator pairs 124, 126 and cable modem 141. Thus it should be appreciated that a variety of implementations are possible and a wide variety of content playback devices can be supported by the gateway 122.

Via the first interface 131, the gateway device 122 can exchange signals and/or information with other devices and/or system elements such as the servers in the network head end 102, via the first, e.g., cable network 161. The first interface 131 supports the receipt and/or transmission of content, and/or other information from/to different servers, e.g., the BFS, SDV server, etc. Each tuner-demodulator pairs in the plurality of tuner/demodulator pairs 124 through 126 is capable of tuning to a given frequency bands to receive programming content and demodulating the received content and/or information. The tuner/demodulator pairs 124 through 126 work under the control of processor 128 and the tuner control module 137.

Via the second interface 132, e.g., home network interface, the gateway device 122 can exchange signals and/or information with other various customer premise equipments such as the content playback devices 110, 114, and 118 via the second, e.g., home network 121. The second interface 132 supports the receipt and/or transmission of content, and/or other information over the home network 121 from/to the various custom premise equipments. For example in various embodiments the recorded program content is supplied to the content playback devices over the home network 121 via the home network interface 132 in accordance with the features of various embodiments of the invention.

The processor 128, e.g., a CPU, executes routines 133 and one or more modules and controls the gateway device 122 to operate in accordance with the invention. The processor 128 is responsible for controlling the general operation of the gateway device 122. To control the gateway device 122, the processor 128 uses information, various modules and/or routines including instructions stored in memory 130.

In addition to the routines 133, the memory 130 includes a message processing module 134, a transcoder and transrating module 136, a tuner control module 137, a content supply control module 138 and a content storage.

Routines 133 include communications routines and/or device control routines. The message processing module 134 is configured to process various messages and signals received by the gateway device 122 from the content playback devices. For example the message processing module 134 receives recording request messages and trick play messages from the content playback devices and provides information to the processor 128 and/or the one or more other modules to take further action in response to the received messages.

The transcoding and transrating module 136 is configured to perform transcoding and transrating operation on program content in accordance with the invention. Thus in some embodiments when the gateway device 122 needs to perform transcoding and transrating operation on the program content stream, e.g., recorded program content, the transcoding and transrating module 136 is used to perform such operations prior to sending the content stream to the content playback devices.

The tuner control module 137 controls the tuner-demodulator pairs by providing them with information and/or parameters needed to tune to a given channel to receive program content at a given time. The tuner control module 137 manages the allocation of tuner-demodulator pairs to one or more content playback devices and keeps track of which tuner-demodulators are available at a given time and which ones have been assigned to content play back devices for recording requested content. In some embodiments the tuner control module 137 receives tuning information and/or other parameters from the message processing module 134 which receives and processes recording messages from the content playback devices. The tuning information and/or other parameters are then used by the tuner control module 137 to control the operation of the tuner-demodulators.

The content supply control module 138 controls the supply of program content to the content playback devices over the home network in accordance with a received trick play command. The content supply control module 138 is also responsive to the stop content message (as discussed in steps 234, 236 in FIG. 2) and upon receipt of the stop content message control the gateway device to stop supplying the program content. In some embodiments when a playback device supports a different rate and/or coding scheme/format than that which is used by the gateway device 122, the content supply control module 138 supplies transcoded or transrated program content, generated by the transcoding and transrating module 136 using recorded program content, to the content playback device in response to a trick play command from the content playback device. The content storage 139 includes a plurality of buffers, e.g., time shift buffers, for recording program content. The content storage 139 includes buffers 1 124' through K 126' corresponding to the tuner-demodulator pairs 1 124 through K 126' and/or content received via the cable modem 141. When assigned by the gateway device an individual buffer from the buffers 1 124' through K 126' record the program content received over the cable network 161 by the corresponding tuner-demodulator pair in the plurality of tuner-demodulator pair 1 124 through K 126. Additional buffers may be included for storing program content received via the cable modem 141. In addition the content storage 139 further includes one or more additional buffers such as the buffer X 135. In some embodiments the additional buffer X 135 is used to record program content received from a content playback device at the customer premise over the home network. This may occur in some embodiments when the tuner-demodulator pairs 124 though 126 are occupied and the gateway device 122 receives a request from a playback device to record content. In such cases the content playback device provides demodulated content to the gateway device 122 over the home network for recording.

As noted above, while some embodiments include both the cable modem and tuner demodulator pairs, some gateway device embodiments do not include a cable modem while other gateway embodiments include a cable modem but do not include traditional QAM tuner/demodulators normally used in older set top boxes to receive video content.

Figure 5:
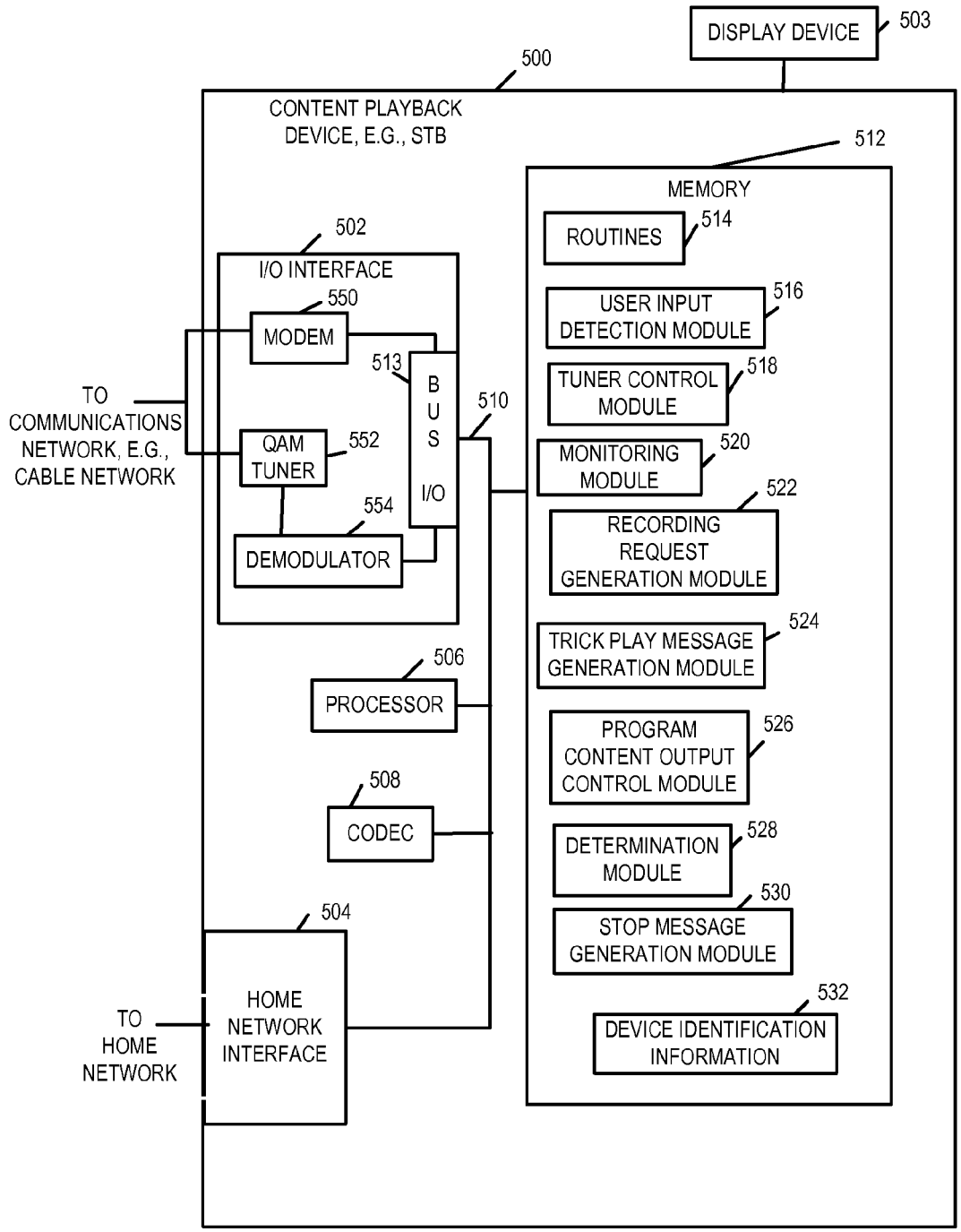
FIG. 5 illustrates an exemplary content playback device, e.g., a set top box, implemented in accordance with one exemplary embodiment.

FIG. 5 illustrates an exemplary content playback device 500, e.g., a set top box, implemented in accordance with one exemplary embodiment. The content playback device 500 may be used as any one of the STBs 110, 114 of the system shown in FIG. 1. As shown, the content playback device 500 is coupled to a display device 503, e.g. a monitor and/or a Television (TV). The STB 500 includes an Input/Output (I/O) interface 502, a home network interface 504, a processor 506, a codec (Coder/Decoder) 508, and a memory 512 coupled together via a bus 510. The various elements of the content playback device 500 can exchange data and information over the bus 510.

Via the I/O interface 502, the content playback device 500 can exchange signals and/or information with other devices and/or system elements such as the servers in the network headend/hubsite 102, via the cable network 161. The I/O interface 502 supports the receipt and/or transmission of content, application data and/or other information from/to different servers, e.g., the BFS, SDV server, etc. The I/O interface 502 in some embodiments also includes, e.g., an infrared signal receiver to receive signals from a user remote control device. Thus in some embodiments the I/O module 502 may include, in addition to a cable network interface, an IR or radio interface for receiving signals from a remote control device. The I/O interface 502 includes a modem 550 which supports receiving content. The I/O interface 502 further includes a QAM tuner 552 and a demodulator 554. The QAM tuner 552 receives programming content from a channel to which the content playback device 500 tunes. The demodulator 554 demodulates the received content and/or information.

Via the home network interface 504 the content playback device 500 can exchange signals and/or information with other various customer premise equipments such as the gateway device 122. The home network interface 504 supports the receipt and/or transmission of content, and/or other information over the home network 121 from/to the gateway device 122 via the home network interface 504. For example in various embodiments the recorded program content is supplied by the gateway device to the content playback device 500 over the home network 121 via the home network interface 132 in accordance with the features of various embodiments of the invention.

The processor 506, e.g., a CPU, executes routines 514 and one or more modules and controls the playback device 500 to operate in accordance with the invention. The processor 506 is responsible for controlling the general operation of the device 500 including, e.g., presentation of information and/or programs for display. To control the device 500, the processor 506 uses information, various modules and/or routines including instructions stored in memory 512. The Codec 508 is implemented as a module and is capable of performing encoding and/or decoding operations on a digital data stream or signal.

In addition to the routines 514, the memory 512 includes a user input detection module 516, a tuner control module 518, a monitoring module 520, a recording request generation module 522, a trick play message generation module 524, a program content presentation module 526, a determination module 528, and a stop message generation module 530, and device identification information 542.

Routines 514 include communications routines and/or device control routines. User input detection module 516 detects a user input, e.g., input from a user received by the device 500. The user input may be sent by a control device such as a remote control, or by other means, e.g., selecting an option by pressing a button on the device or icon on a touch screen etc. User input signals from a remote control may be received via I/O module 502. The user input detection module 516 determines, on receipt of an input, e.g., a control signal providing user input, what type of selection has been made by the user, e.g., a channel selection instructing to tune to a specific channel, a trick play command to perform a trick play function, a program guide selection, or another input indicating a user desired change in a playback mode in which the playback device 500 operates, etc. The user input detection module 516 is further configured to monitor to detect a trick play command received from a user control device (e.g., remote control). In some embodiments the user input detection module 516 is further configured to monitor for a user command from a user input device indicating user desired change to a real time mode of playback operation.

The tuner control module 518 is configured to control the tuner 552 to tune to a frequency corresponding to a program channel to be viewed. This may be a user selected channel or, a channel to be tuned to when instructed by a server in the headend/hubsite 102. The monitoring module 520 is configured to monitor to detect reaching of a live playback point during playback of content supplied by the gateway device 122, the live playback point being a current point at which program content is being supplied from a content source via the first network.

The recording request generation module 522 is configured to generate a recording request for the gateway device to record program content corresponding to a program. In some embodiments the generation module 522 also includes program identification information, tuning information and/or other relevant parameters that the gateway device may need to receive the program content for recording. In various embodiments the processor 506 is configured to send the recording request to the gateway device requesting the gateway device to record program content corresponding to a selected program. The recording request in various embodiments is sent to the gateway device 122 over the home network 121.

The trick play message generation module 524 is configured to generate a trick play message, the trick play message being a request to the gateway device to provide a portion of the program in accordance with a trick play command, e.g., a rewind, pause command. In various embodiments the processor 506 is configured to send the trick play message to the gateway device 122 over the home network 121 when the input detection module 516 detects a trick play command received from a user control device.

In various embodiments the processor 506 is configured to control the device 500 to receive program content in accordance with the trick play command from the gateway device over the local home network, e.g., via the home network interface 504.

The program content output control module 526 is configured to control the presentation and playback of program content from the playback device 500 to the user, e.g., on the display device 503. For example during normal content playback operation the program content output control module 526 controls the playback device to output a first portion of a selected program received over a first network, e.g., cable network, from a content server, e.g., from BFS or SDV server. When a trick play command is received and the playback device receives recorded program content in accordance with the trick play command from the gateway device, the program content output control module 526 controls the playback device 500 to switch from outputting program content received via the first network, to outputting program content received from the gateway device over the home network.

The determination module 528 is configured to determine and decide whether the gateway device 500 should switch to outputting program content received over the first network, e.g., via I/O interface 502 or to continue using program content being supplied by the gateway device over the home network, e.g., via home network interface 504, when a user input device indicating user desired change to a real time mode of playback operation is detected or when a live playback point is reached during content playback. In some embodiments the decision whether to switch to outputting program content received via said first network or to continue using program content being supplied by said gateway device is performed as a function of network congestion on the second, e.g., home network, being used to supply content from the gateway device to said playback device 500.

In accordance with some features of the invention, when the playback device 500 is outputting program content the program content received over the home network from the gateway device and the determination module 528 makes a decision to switch to outputting program content received over the first network, then the output control module 526 controls the playback device 500 to switch to switch to outputting program content received from said first network to the user, e.g., on the display device 503. If the determination module 528 makes a decision to switch to continue outputting program content received over the second network (e.g., home network), then the output control module 526 controls the playback device 500 to continue outputting the program content received from the gateway device.

The stop message generation module 530 is configured to generate a stop content message including an instruction for the gateway device to stop providing program content to the playback device 500. In various embodiments such a stop message is generated by the generation module 530 when the determination module 528 decides to switch to outputting program content received over the first network from outputting the content received from the gateway device. When the when the determination module 528 makes the decision to switch to outputting program content received over the first network, the processor 506 controls the gateway device 500 to send the stop message to the gateway device over the home network via the home network interface 504.

In some embodiments, one or more of the various modules discussed above work in coordination, e.g., with operations being merged to perform a function, to produce a desired output in accordance with the exemplary methods of the invention.

The device identification information 532 may include, e.g., Media Access Control (MAC) address of the playback device 500 or some other identifier identifying the playback device 500.

An exemplary method of supporting trick playback of a program (e.g., movie, television show, etc) at a customer premise, in accordance with some embodiments, comprises: operating a playback device (e.g., STB) at the customer premise to send a message to a gateway device located at said customer premise to trigger recording of said program by said gateway device; operating the playback device to receive program content corresponding to said program via a first network (e.g., a cable network); operating the playback device to output a first portion of said program; operating the playback device to monitor for trick play commands (e.g., pause, rewind, fast forward) during playback of said content; and in response to said monitoring detecting a trick play command received from a user control device (e.g., remote control), sending a trick play message to the gateway device requesting said gateway device to provide a second portion of said program in accordance with said trick play command. The second portion can be part of said first portion which was previously recorded, e.g., one or more frames supplied in response to a rewind, pause or other trick play command.

In some embodiments the gateway device is operated to receive the program content via said first network in parallel with the playback device receiving said program content via the first network.

In some embodiments the exemplary method further includes: operating said playback device to receive program content in accordance with said trick play command from said gateway device; and operating said playback device to switch from outputting program content received via said first network to outputting program content received from said gateway device.

In some embodiments operating the playback device to receive program content from the gateway device includes operating the playback device to receive program content via a second network, said second network being a local network located at said customer premise.

In some embodiments the exemplary method further includes: operating the playback device to: monitor for a user command from a user input device indicating user desired change to a real time mode of playback operation or reaching of a live playback point, said live playback point is a current point at which program content is being supplied from a content source via the first network; and make a decision whether to switch to outputting program content received via said first network or to continue using program content being supplied by said gateway device.

In some embodiments making a decision whether to switch to outputting program content received via said first network or to continue using program content being supplied by said gateway device is performed as a function of network congestion on said second network being used to supply content from the gateway device to said playback device.

In some embodiments the exemplary method further includes: operating the playback device to send, when said decision is to switch to outputting program content received from said first network, a stop message to the gateway device instructing the gateway device to stop providing program content to the playback device.

In some embodiments the exemplary method further includes operating the playback device to continue, when said decision is to continue using program content being supplied by said gateway device, to receive the program content in real time from the gateway device.

In some embodiments the exemplary method further includes operating the gateway device to perform at least one of transcoding or transrating on the recorded program content; and supply the transcoded or transrated program content to said playback device in response to the trick play message.

In some embodiments the playback device is an IP capable device which receives program content from an IP capable content server. In some embodiments the gateway device receives said program content from a network source (e.g., a content server in cable headend, hubsite or a switched digital video source) which is different from the IP capable content server. In some embodiments the network source is one of a broadcast file server or a switched digital video content server. In some embodiments the first network is a cable network and the second network is an Ethernet network.

An exemplary system that supports trick playback of a program (e.g., movie, television show, etc) at a customer premise, in accordance with some embodiments, comprises: a gateway device located at said customer premise; and a content play back device at said customer premise. In some embodiments the content playback device comprises a request message generation module configured to generate a request message requesting recording of said program by said gateway device; a first interface including a receiver configured to receive program content corresponding to said program via a first network; a content output control module configured to output a first portion of said program; an input detection module configured to monitor for trick play commands during playback of said content; and a trick play message generation module configured to generate a trick play message to send to the gateway device requesting said gateway device to provide a second portion of said program in accordance with said trick play command, said trick play message being sent to the gateway device in response to detecting a trick play command received from a user control device.

In some embodiments the gateway device includes an interface configured to receive said program content via said first network in parallel with said playback device receiving said program content via the first network. In some embodiments the content playback device further includes a second interface configured to receive program content in accordance with said trick play command from said gateway device. In some embodiments the content output control module is further configured to control the playback device to switch from outputting program content received via said first network to outputting program content received from said gateway device.

In some embodiments the second interface of said content playback device is further configured to receive program content from said gateway device via a second network, said second network being a local network located at said customer premise.

In some embodiments the input detection module is further configured to monitor for a user command from a user input device indicating user desired change to a real time mode of playback operation or reaching of a live playback point, said live playback point being a current point at which program content is being supplied from a content source via the first network. In some embodiments the content playback device further includes a determination module configured to decide whether said content playback device is to switch to outputting program content received via said first network or to continue using program content being supplied by said gateway device. In some embodiments the determination module is configured to decide whether said content playback device is to switch to outputting program content received via said first network or to continue using program content being supplied by said gateway device as a function of network congestion on said second network being used to supply content from said gateway device to said playback device.

In some embodiments the content playback device further includes a stop message generation module configured to generate a stop message communicating an instruction to the gateway device to stop providing program content to said playback device via the second interface, and the content playback device is further configured to send, e.g., via the second interface, said stop message to said gateway device when said determination module decides that the content playback device is to switch to outputting program content received via said first network.

In some embodiments the gateway device further comprises a transcoding and transrating module configured to perform at least one of transcoding or transrating on recorded program content, and a content supply control module configured to control supply of transcoded or transrated program content to said content playback device in response to said trick play message.

In some embodiments the content playback device is a set top box. In some embodiments the content playback device is an IP capable device such as one of a cellular phone, a tablet device, a laptop, or an internet capable Television.

Various examples in which the methods and apparatus of the present invention may be used will now be discussed:

EXAMPLE 1

A playback device, e.g., STB (set top box) tunes to a live TV stream using its local QAM (Quadrature amplitude modulation) tuner and demodulates and outputs the received TV program content, e.g., to a display device coupled to the playback device or integrated into the playback device. A video gateway with DVR capability receives a message containing the details of the tune (i.e. QAM triplet) from the STB through a standard or proprietary method, e.g., via message sent over a local network coupling the video gateway and STB. The video gateway, if it has a tuner available, also tunes to that same live TV stream as the STB using its local QAM tuner, and then begins recording the live TV stream in a time shift buffer (TSB). When a user presses pause or rewind on the STB, that STB requests the content corresponding to the received trick play command from the video gateway indicating the appropriate trick mode. The content may then be streamed from the gateway to the STB in a secure form with the STB being a DLNA compliant device and the streaming being implemented in accordance with DLNA requirements, e.g., security requirements. The video gateway serves the STB the paused or rewound content, i.e. program stream, and the user is able to perform normal time shift buffer supported actions, e.g., trick play operations, through the STB which communicates received trick play commands to the user to the video gateway which alters the content stream to the STB accordingly to satisfy the trick play request.

In one embodiment of this process when the STB user returns to the "live" point in the time shift buffer, e.g., the content is streamed as soon as it is received and stored in the buffer, the STB resumes, i.e., shifts the source of the content output to the display, back to its local QAM tuner away from the stream being supplied by the video gateway. This allow the gateway to reclaim its tuner if it is need to support a higher priority feature than supporting trick play on the STB. In a different embodiment of this process the STB continues to display content received from the video gateway, even if the user is watching "live", i.e., as the content is received by the gateway from the network. This may allow a more seamless experience since switching back to the local tuner is not required. However, such an approach requires continued use of the local network. In some embodiments the decision whether to switch to the local tuner upon reaching the live point is based on local network congestion with a high level of network congestion and/or a high load on the local network which might interfere with reliable receipt of the content stream being used to trigger switching back to the local tuner thereby reducing the load on the local network.

EXAMPLE 2

In this example, the methods and apparatus of the present invention are applied to an IP set top box which has access to a video gateway device with DVR capability via a local network. In such an embodiment, the IP STB subscribes to a multicast stream directly from an IP content server, e.g., IPTV,-over-DOCSIS network. While a cable modem or other device still translates the video signal from DOCSIS to Ethernet, this is still a similar situation to Example 1, in that the cable modem will receive the content from the cable network during normal playback operation and supply the content received via the cable network to the IP set top box or other IP capable playback device. The cable modem may be integrated directly into the IP set top box in some embodiments.

When the IP STB subscribes to the multicast IPTV stream, the video gateway is also controlled to subscribe to the multicast stream and begins recording the content of the multicast stream. The rest of the details are similar to Example 1. When a user presses pause or rewind on the IP STB, the IP STB requests the content from the video gateway device in accordance with the trick play request. The contents are then received, via the local network, form the video gateway in accordance with the trick play request in compliance with DLNA and then decoded and output for display. When the user reaches the "live" point in the program stream, the IP STB can remain on the video feed from the video gateway or it can resume outputting content obtained via its multicast subscription with the decision to switch from the gateway being made in the same or similar manner to the way in which the decision to switch is made in Example 1.

EXAMPLE 3

An iPad or other IP capable playback device requests a unicast program stream from an IP content server. This can be done via a simple Cable Modem through which content can be received from the IP content sever. In such an embodiment, the video gateway is sent a message indicating the program and/or program channel to be recorded. In response the video gateway tunes to a program channel on which the identified program is supplied and starts recording that same program with its local QAM tuner. Note that the stream that the video gateway records is not necessarily in an appropriate format for the iPad or other IP playback device and may require transcoding and/or transrating by the gateway prior to being supplied to the iPad or other IP playback device.

When a user presses pause or rewind on the iPad or other IP playback device, the iPad then begins requesting a stream from the video gateway in accordance with the received trick play command. In some embodiments the request message includes information indicating one or more coding formats and/or date rates supported by the iPad or other IP playback device. The video gateway receives the request and transcodes and/or transrates the recorded content to a format supported by the iPad or other requesting IP playback device in the event the content is not already in a format supported by the requesting device. The content is formatted and packetized and protected with the appropriate digital rights management, e.g., encryption, prior to being transmitted to the requesting device over the home network. In at least some embodiments the transmission to the IP playback device is over standard HTTP and not over DLNA. The receiving device decrypts, decodes and take any other necessary steps to recover the communicated content and then outputs the content received from the gateway to the display on or attached to the IP playback device thereby supporting the trick play request made by the user of the IP playback device.

When the user reaches the "live" point in the stream, the iPad or other IP playback device can either remain displaying the video gateway feed or it can resume outputting content received from the IP content server without having passed through the gateway device.

The above examples are provided to facilitate understanding of some of the many various embodiments supported by the methods and apparatus of the invention and are not intended to be limiting in nature.

In various embodiments system elements described herein are implemented using one or more modules which are used to perform the steps corresponding to one or more methods of the present invention, for example, receiving program content corresponding to a program over a first network, sending a record message to a gateway device, processing program content, sending a trick play message to a gateway device etc.

In the above described methods, in some embodiments, each step may be performed by one or more different software instructions executed by a computer processor, e.g., a central processing unit (CPU). At least one system implemented in accordance with the present invention includes a means for implementing each of the various steps which are part of the methods of the present invention. Each means may be, e.g., an instruction, processor, hardware circuit and/or combination of elements used to implement a described step.

Many of the above described methods or method steps can be implemented using machine, e.g., computer, executable instructions, such as software, included in a non-transitory machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow.

What is claimed is:

1. A method of receiving and using content at a customer premise, the method comprising:
   operating both a gateway device and a playback device at the customer premise to both receive content of a program in parallel from a first network;
   operating the gateway device to store the content of the program;
   operating the playback device to receive content from the gateway device located at said customer premise, said content being content of the program which was received and stored at the gateway device and which is being supplied by the gateway device, via a second network, to the playback device as part of a trick play operation;
   operating the playback device to monitor for a user command from a user input device indicating user desired change to a real time mode of playback operation or reaching of a live playback point, said live playback point being a current point at which program content is being supplied from a content source via the first network; and
   making a decision based on network congestion on the second network, in response to the user command from the user input device indicating the user desired change to a real time mode of playback operation or in response to reaching of a live playback point, whether to switch to outputting program content of the program received at the playback device from the first network or to outputting program content being supplied via the second network by said gateway device that was received by the gateway device from the first network.

2. The method of claim 1,
   wherein said first network is a network which connects said playback device and said gateway device to a source of the program content outside said customer premise;
   wherein said second network is a home network located in said customer premise.

3. The method of claim 2, further comprising:
   sending, when said decision is to switch to outputting program content received via said first network, a stop message to said gateway device instructing the gateway device to stop providing program content to said playback device.

4. The method of claim 3, further comprising:
   continuing, when said decision is to output program content being supplied by said gateway device, to receive said program content in real time from said gateway device via the second network.

5. The method of claim 4, further comprising:
   operating said gateway device to perform at least one of transcoding or transrating on the recorded program content; and
   supplying said transcoded or transrated program content to said playback device in response to a trick play message.

6. The method of claim 2, further comprising:
   operating the playback device to make an assessment of congestion on the second network prior to making said decision whether to switch to outputting program content of the first program received at the playback device from the first network or to output program content being supplied by said gateway device that was received by the gateway device from the first network via the second network.

7. The method of claim 6, further comprising:
   operating the gateway device to stop using a tuner to receive said program content, while said first network is providing said program content to the playback device, following said playback device making a decision to switch to outputting program content of the program received at the playback device from the first network.

8. The method of claim 2, further comprising:
   operating the playback device to receive network congestion information from a network controller, said received network congestion information being used in making said decision.

9. The method of claim 1, wherein the first network is a cable network.

10. The method of claim 9, wherein said playback device receives said content from the gateway device via a first network interface which is different from a second network interface used to receive program content from the first network.

11. A system for supporting trick playback of a program at a customer premise comprising:
    a gateway device comprising:
       an interface to receive content of a program via a first network; and
       memory to store the content of the program; and
    a playback device, said playback device comprising:
       a first interface to receive content of the program via the first network;
       a second interface to receive content from said gateway device located at said customer premise, said content being content of the program which was received and stored at the gateway device and which is being supplied to the playback device by the gateway device, via a second network, as part of a trick play operation;

an input detection module to monitor for a user command from a user input device indicating user desired change to a real time mode of playback operation;

a monitoring module to detect reaching of a live playback point, said live playback point being a current point at which program content is being supplied from a content source via the first network; and a determination module to make a decision based on network congestion on the second network, in response to the user command from the user input device indicating the user desired change to a real time mode of playback operation or in response to reaching of a live playback point, whether to switch to outputting program content received at the playback device via said first network which supplies the content in real time or to output program content being supplied via the second network by said gateway device that was received by the gateway device from the first network.

12. The system of claim 11, wherein said second network is a home network located in said customer premise.

13. The system of claim 12, wherein said playback device further includes a stop message generation module to generate a stop message communicating an instruction to the gateway device to stop providing program content to said playback device; and wherein said playback device sends said stop message to said gateway device when said decision is to switch to outputting program content received from said first network.

14. The system of claim 13, wherein said playback device continues, when said determination module makes a decision to output program content being supplied by said gateway device, to receive said program content in real time from said gateway device via the second network.

15. The system of claim 14, wherein said gateway device further comprises:

a transcoding and transrating module to perform at least one of transcoding or transrating on recorded program content; and a content supply control module to control supply of transcoded or transrated program content to said content playback device in response to a trick play message.

16. The system of claim 15, wherein said playback device makes an assessment of congestion on the second network prior to making said decision whether to switch to outputting program content of the program received at the playback device from the first network or to output program content being supplied via the second network by said gateway device that was received by the gateway device from the first network.

17. The system of claim 16, wherein said gateway device stops using a tuner to receive said program content, while said first network is providing said program content to the playback device, following said playback device making a decision to switch to outputting program content of the first program received at the playback device from the first network.

18. The system of claim 12, wherein said playback device receives network congestion information from a network controller, said received network congestion information being used in making said decision.

19. The system of claim 11, wherein the first network is a cable network.

20. The system of claim 19, wherein said second network interface used to receive program content from the second network is different from said first interface via which the playback device receives said content from the first network.

\* \* \* \* \*